United States Patent
Maeda et al.

(10) Patent No.: US 7,852,594 B2
(45) Date of Patent: Dec. 14, 2010

(54) DEVICE AND METHOD FOR SPECIFYING CONTROL VALUE FOR CONTROLLING CLEARANCE BETWEEN HEAD AND DISK, AND MAGNETIC DISK DRIVE DEVICE

(75) Inventors: Yoshihiko Maeda, Kanagawa (JP); Takao Matsui, Kanagawa (JP); Nobuhiro Kuwamura, Kanagawa (JP); Kenichi Kuramoto, Kanagawa (JP); Akihiro Sera, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 5 days.

(21) Appl. No.: 12/156,092

(22) Filed: May 28, 2008

(65) Prior Publication Data
US 2009/0296260 A1    Dec. 3, 2009

(30) Foreign Application Priority Data
May 28, 2007    (JP)    ............................. 2007-141170

(51) Int. Cl.
*G11B 21/02*    (2006.01)
(52) U.S. Cl. ....................................................... 360/75
(58) Field of Classification Search ........................ None
See application file for complete search history.

(56) References Cited
U.S. PATENT DOCUMENTS

| | | | |
|---|---|---|---|
| 6,191,901 B1 * | 2/2001 | Carlson et al. ................ 360/31 |
| 6,765,745 B2 * | 7/2004 | Smith et al. ................... 360/75 |
| 6,950,267 B1 * | 9/2005 | Liu et al. ....................... 360/75 |
| 6,972,919 B2 * | 12/2005 | Suk .............................. 360/75 |
| 7,271,975 B2 * | 9/2007 | Shimizu et al. ............... 360/75 |
| 7,292,401 B2 * | 11/2007 | Shen et al. .................... 360/69 |
| 7,330,323 B1 * | 2/2008 | Singh et al. ................... 360/48 |
| 7,362,534 B1 * | 4/2008 | Schreck et al. ................ 360/75 |
| 7,369,341 B2 * | 5/2008 | Yokohata et al. .............. 360/31 |
| 7,423,832 B2 * | 9/2008 | Buch et al. .................... 360/75 |
| 7,426,090 B2 * | 9/2008 | Yamashita et al. ............ 360/75 |
| 7,602,574 B2 * | 10/2009 | Ishii ............................. 360/75 |
| 2005/0024761 A1 | 2/2005 | Lou et al. |
| 2005/0052773 A1 | 3/2005 | Suk |

FOREIGN PATENT DOCUMENTS

JP    2006-269005 A    10/2006

\* cited by examiner

*Primary Examiner*—K. Wong

(57) ABSTRACT

Embodiments of the present invention help to detect contact between a head and a magnetic disk more accurately in specifying a heater power value for adjusting a clearance between a head element portion and the disk. According to one embodiment, a hard disk controller/multiprocessing unit (HDC/MPU) measures amplitudes of read signals in a user data field DATA. A hard disk drive (HDD) fills a gap between servo data with single data sector. The HDC/MPU measures the amplitudes of read signals in each data sector at different heater power values. It determines the heater power value at which contact occurs from the measured values.

13 Claims, 9 Drawing Sheets

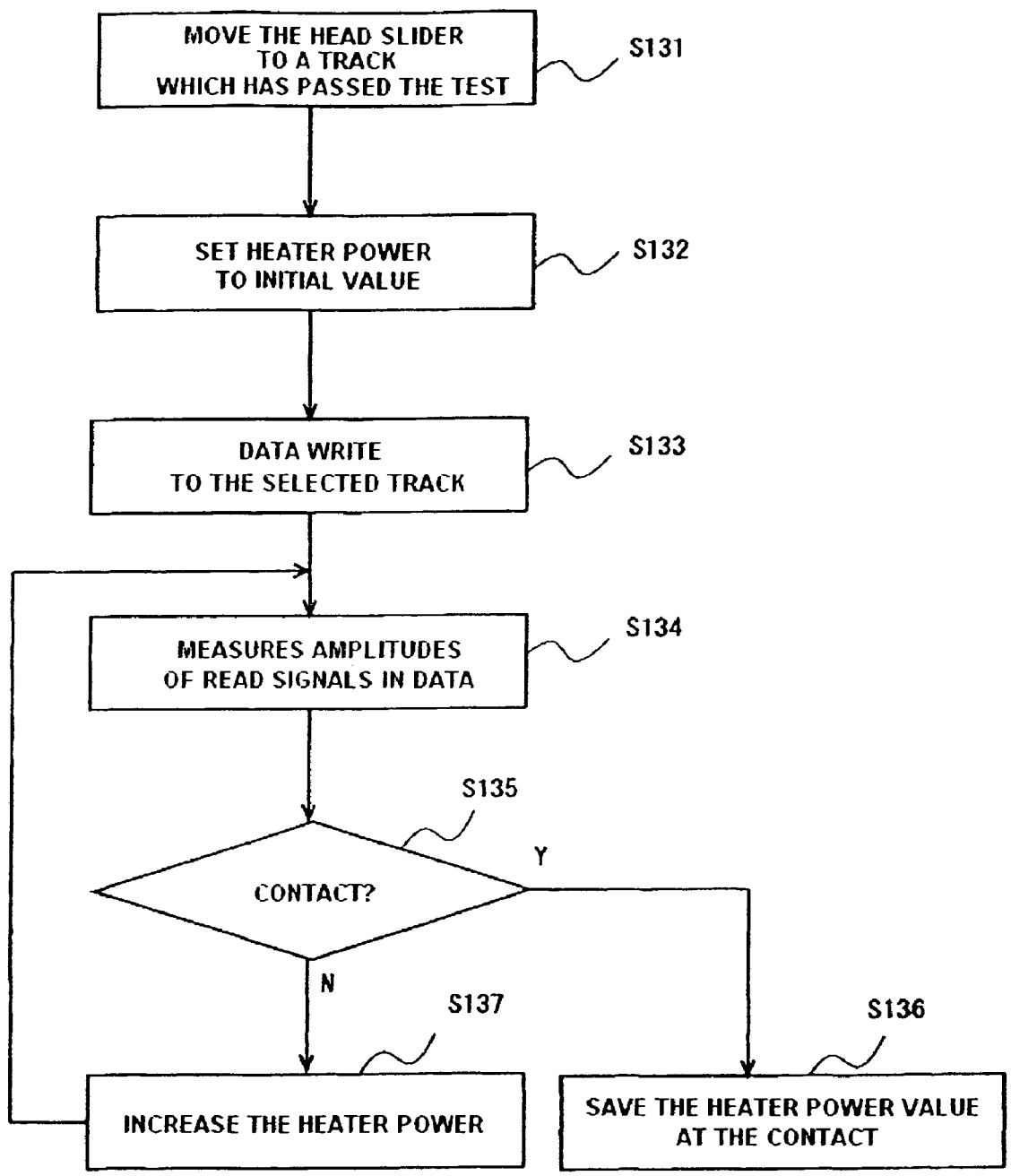

DEVICE AND METHOD FOR SPECIFYING CONTROL VALUE FOR CONTROLLING CLEARANCE BETWEEN HEAD AND DISK, AND MAGNETIC DISK DRIVE DEVICE

CROSS-REFERENCE TO RELATED APPLICATION

The instant nonprovisional patent application claims priority to Japanese Patent Application No. 2007-141170 filed May 28, 2007 and which is incorporated by reference in its entirely herein for all purposes.

BACKGROUND OF THE INVENTION

Disk drive devices using various kinds of disks, such as an optical disk, a magneto-optical disk, and a flexible magnetic disk, have been known in the art. In particular, a hard disk drive (HDD) has been widely used as a storage device of a computer and has been one of indispensable disk drive devices for current computer systems. Moreover, the HDD has found widespread application such as a removable memory used in a moving image recording/reproducing apparatus, a car navigation system, a cellular phone, or a digital camera, as well as the computer, due to its outstanding characteristics.

Magnetic disks used in the HDD have a plurality of data tracks formed concentrically. Each data track has a plurality of servo data having address information and a plurality of data sectors containing user data recorded thereon. Between each servo data, a plurality of data sectors are recorded. A head element portion of a head slider supported by a swinging actuator accesses a desired data sector according to address information of servo data, which allows data write to and data retrieval from a data sector.

In order to increase recording density of a magnetic disk, it is important to decrease variations in clearance between the head element portion flying over the magnetic disk and the magnetic disk; some mechanisms have been proposed to adjust the clearance. One of such mechanisms has a heater in a head slider which heats the head element portion to adjust the clearance (for example, refer to Japanese Patent Publication No. 2006-269005 "Patent Document 1"). In the present specification, it is called thermal fly-height control (TFC). The TFC generates heat by applying electric current to the heater to make the head element portion protrude by thermal expansion. This reduces the clearance between the magnetic disk and the head element portion. Another mechanism has been known that uses a piezo element to adjust the clearance between the magnetic disk and the head element portion.

In an HDD having such a mechanism that adjusts the clearance between the head element portion and the magnetic disk or the clearance between the slider and the magnetic disk, it is required that a control value to achieve a proper clearance is specified. The control value is a heater control value such as heater power in the TFC or a voltage to be applied to a piezo element in the mechanism using the piezo element. The variations in the clearance between the head element portion and the magnetic disk or in the clearance corresponding to the control value are varied depending on the head slider. It is desirable that the control value in a read/write operation is individually set to each head slider (see Patent Document 1, for example).

A technique to specify a proper control value for each head slider varies the clearance between the head element portion and the magnetic disk to detect contact between the head slider and the magnetic disk. The proper control value for the head slider can be specified from the control value at the contact. Contact of the head slider to the magnetic disk can be detected from, for example, a sensed value of an acoustic emission sensor, a positional error signal, read signal strength of a read element, a control value of a voice coil motor, or the like.

Use of a specific detector like an acoustic emission sensor causes issues like increase in the number of components of the HDD and cost. On the other hand, positional error signals and read signal strength can be measured by normal functions of the HDD so that contact between the head slider and the magnetic disk can be detected without implementing a new circuit or the like in the HDD.

When positional error signals or signal strength is measured with servo signals, however, slight contact may not be detectable. Servo data are recorded discretely in a circumferential direction on the magnetic disk. If the oscillation cycle of the head slider due to contact with the magnetic disk is smaller than the cycle of discretely recorded servo data produced by the rotation of the magnetic disk, namely, if the oscillation frequency due to contact is greater than the reading frequency of the servo data, the oscillation due to contact cannot be properly detected from the servo signals. Typically, it is difficult to detect oscillation with the band width of a half or more of the band width of the servo data. Therefore, contact cannot be detected until greater contact or oscillation with a greater amplitude caused thereby (oscillation with a smaller frequency) arises.

It is therefore required to detect contact between the head slider (head element portion) and the magnetic disk within small contact and a short period so as to prevent the head element portion or the magnetic disk from being damaged due to the contact between the head slider and the magnetic disk in addition to accurately determine the control value at which the contact occurs. The amplitudes of read signals in user data between servo data can be measured at more points than in the servo data. Therefore, smaller contact can be detected in a shorter period.

However, the user data are recorded in data sectors being discrete from each other in a data track. The HDD cannot measure accurate amplitudes of read signals for detection of contact in a gap between data sectors and a control signal area included in a data sector. Since there are several data sectors between servo data in a typical HDD, it is required for the HDD to measure amplitudes of read signals avoiding the gap and the control signal area, or to measure amplitudes of read signals in an area including these areas and select values measured in the user data area from the measured values. This significantly restricts the effect in detection of contact using the amplitudes of read signals.

BRIEF SUMMARY OF THE INVENTION

Embodiments of the present invention help to detect contact between a head and a magnetic disk more accurately in specifying a heater power value for adjusting a clearance between a head element portion and the disk. According to the particular embodiment of FIG. 1, an hard disk controller/multiprocessing unit (HDC/MPU) 23 measures amplitudes of read signals in a user data field DATA. An HDD 1 fills a gap between servo data with single data sector. The HDC/MPU 23 measures the amplitudes of read signals in each data sector at different heater power values. It determines the heater power value at which contact occurs from the measured values.

BRIEF DESCRIPTION OF THE DRAWINGS

FIG. 9 is a flowchart illustrating the flow of measurement using the TFC according to one embodiment.

DETAILED DESCRIPTION OF THE INVENTION

Figure 1:
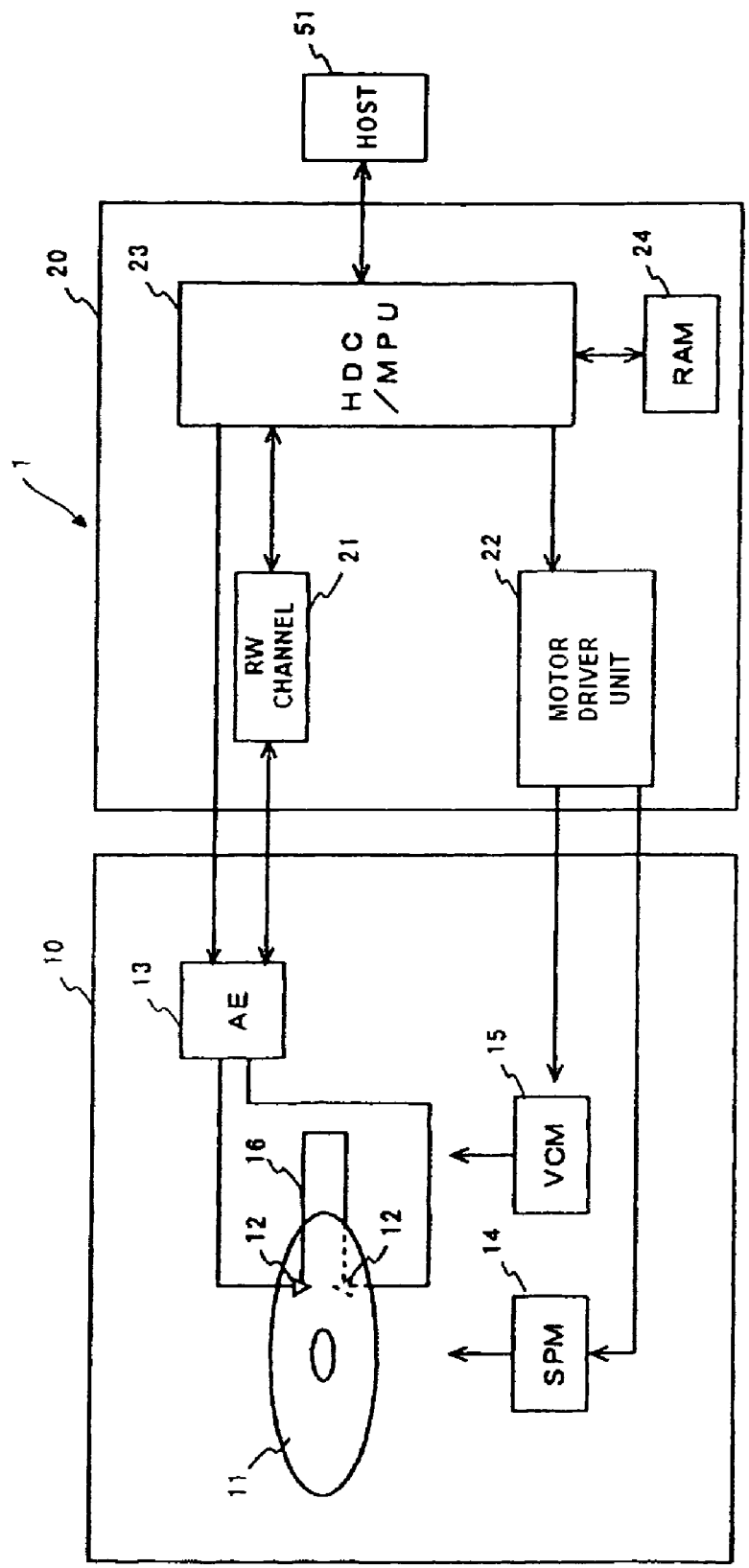
FIG. 1 is a block diagram schematically showing the entire configuration of the HDD in one embodiment.

Embodiments of the present invention relate to a device and a method for specifying a control value for controlling a clearance between a head and a disk, and a magnetic disk drive device, and more particularly, relate to a technique for determining a control value at which a head and disk contact occurs and specifying a control value in a normal operation from the determined control value.

An aspect of embodiments of the present invention is a method for fabricating a disk drive device. The method assembles a disk drive device having a head and a disk and being capable of adjusting a clearance between the head and the disk. It writes a data track in which respective sections between a plurality of servo data formed discretely in a circumferential direction are one continuous sector. It measures amplitudes of read signals at each of a plurality of points of the data track at each of a plurality of different clearance control values. It determines a clearance control value at which the head contacts the disk using a value indicating the measured amplitudes of read signals. And it specifies a clearance control value in a normal operation using the determined clearance control value. Measurement can be made at substantially any points between servo data because the section between servo data in a data track is constituted by one continuous sector.

The method may measure amplitudes of read signals at a plurality of points in each of all the sectors. This achieves more reliable contact determination.

Intervals between the measuring points may be constant in each of all the sectors if the measuring is performed at more than two points in each of all the sectors. This achieves more reliable contact determination.

The respective measuring point positions of the respective sectors may be common in all the sectors. This achieves more reliable contact determination.

Another aspect of embodiments of the present invention is a device for specifying a clearance control value in a disk drive device having a function for controlling a clearance between a head and a disk. This device comprises a disk having a plurality of servo data formed discretely in a circumferential direction, a head flying above a rotating disk, and a controller for controlling a clearance between the head and the disk. The head writes a data track in which respective sections between the plurality of servo data are consisted of one continuous sector. The controller measures amplitudes of read signals at each of a plurality of points of the data track at each of a plurality of different clearance control values, determines a clearance control value at which the head contacts the disk using a value indicating the measured amplitudes of read signals, and specifies a clearance control value in a normal operation using the determined clearance control value. Measurement can be made at substantially any points between servo data because the section between servo data in a data track is constituted by one continuous sector.

In an example, the head comprises a slider flying above a rotating magnetic disk, a head element portion disposed on the slider, and a heater for making the head element portion protrude by thermal expansion to adjust a clearance between the head element portion and the disk. This achieves accurate clearance control.

Yet another aspect of embodiments of the present invention is a method for specifying a clearance control value in a disk drive device having a function for controlling a clearance between a head and a disk. This method writes a data track in which respective sections between a plurality of servo data formed discretely in a circumferential direction are one continuous sector. It measures amplitudes of read signals at each of a plurality of points of the data track at each of a plurality of different clearance control values. It determines a clearance control value at which the head contacts the disk using a value indicating the measured amplitudes of read signals. And it specifies a clearance control value in a normal operation using the determined clearance control value. Measurement can be made at substantially any points between servo data because the section between servo data in a data track is constituted by one continuous sector.

Embodiments of the present invention achieve more accurate detection of contact between the head and the disk in specifying a control value for adjusting the clearance between the head and the disk.

Hereinafter, particular embodiments of the present invention are described. For clarity of explanation, the following description and the accompanying drawings contain omissions and simplifications as appropriate. Throughout the drawings, the like components are denoted by like reference numerals, and their repetitive description is omitted if not necessary for the sake of simplicity. Hereinafter, a hard disk drive (HDD) will be described by way of example of a disk drive device: A feature of the HDD according to embodiments of the present embodiment is a method for specifying a control value for controlling a clearance between a head element portion and a magnetic disk.

First, an entire configuration of an HDD is outlined referring to FIG. 1. A circuit board 20 is fixed outside of an enclosure 10. On the circuit board 20, circuits such as a read-write channel (RW channel) 21, a motor driver unit 22, an integrated circuit (HDC/MPU) 23 of a hard disk controller (HDC) and an MPU, and an RAM 24 are implemented. In the enclosure 10, a spindle motor (SPM) 14 rotates a magnetic disk 11 at a specific angular rate. A magnetic disk 11 is a disk for storing data. The motor driver unit 22 drives the SPM 14 in accordance with control data from the HDC/MPU 23.

Each head slider 12 includes a slider and a head element portion and flies above the magnetic disk. The head slider 12 according to the present embodiment includes a heater which expands and protrudes the head element portion by heat for thermal fly-height control (TFC) to adjust the clearance between the bead element portion and the magnetic disk 11. This heater is an adjustment mechanism for adjusting the clearance between the head element portion and the magnetic disk 11. The structure of the head slider 12 will be described later in detail referring to FIG. 3.

Each head slider 12 is fixed to a tip end of an actuator 16. The actuator 16, which is coupled to a voice coil motor (VCM) 15, pivots about a pivotal shaft to move the head slider 12 above the magnetic disk 11 in its radial direction. The motor driver unit 22 drives the VCM 15 in accordance with control data from the HDC/MPU 23. An arm electronics (AE) 13 selects a head slider 12 to access (read from or write to) the magnetic disk 11 from a plurality of head sliders 12 in accordance with control data from the HDC/MPU 23 and amplifies read/write signals. The AE 13 also supplies the heater of the head slider 12 selected in accordance with the control data from the HDC/MPU 23 with electric power (electric current) and functions as an adjustment circuit for adjusting the electric energy.

The RW channel 21 amplifies read signals supplied from the AE 13 by auto gain control (AGC) using a variable gain amplifier (VGA) to a specific amplitude in a read operation. Then, the RW channel 21 extracts data from the obtained read signals to perform a decoding process. The decoded data are supplied to the HDC/MPU 23. The RW channel 21 code-modulates write data supplied from the HDC/MPU 23 and further converts the code-modulated data into write signals to supply them to the AE 13.

The HDC/MPU 23 as an example of a controller performs entire control of the HDD 1 in addition to necessary processes concerning data processing such as read/write operation control, command execution order management, positioning control of the head slider 12 using servo signals (servo control), interface control to and from a host 51, defect management, and error handling operations. The HDC/MPU 23 according to the present embodiment determines heater power values depending on operating conditions and the head slider 12, and sets and registers the values in the HDD 1 in its fabricating steps in addition to performing the TFC. This will be described in detail later.

Figure 2:
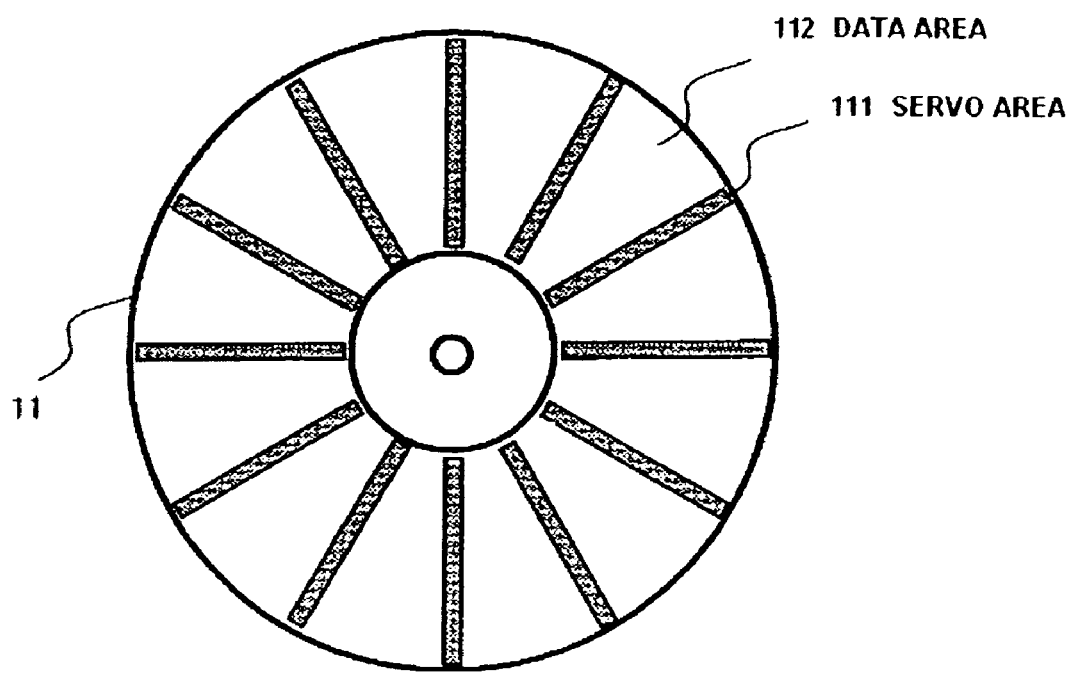
FIG. 2 schematically depicts servo data and user data recorded on a recording surface of the magnetic disk in one embodiment.

FIG. 2 schematically shows recorded data on the magnetic disk 11. As shown in FIG. 2, on the recording surface of the magnetic disk 11, a plurality of servo areas 111 extending radially in the radial direction from the center of the magnetic disk 11 at every specific angle and data areas 112 between the adjoining two servo areas 111 are formed. The servo areas 111 and data areas 112 are provided alternately at a specific angle. In each servo area 111, servo data for controlling positioning of the bead slider 12 are recorded. In each data area 112, user data are recorded. The user data and the servo data are recorded on concentric data tracks and servo tracks, respectively.

Figure 3:
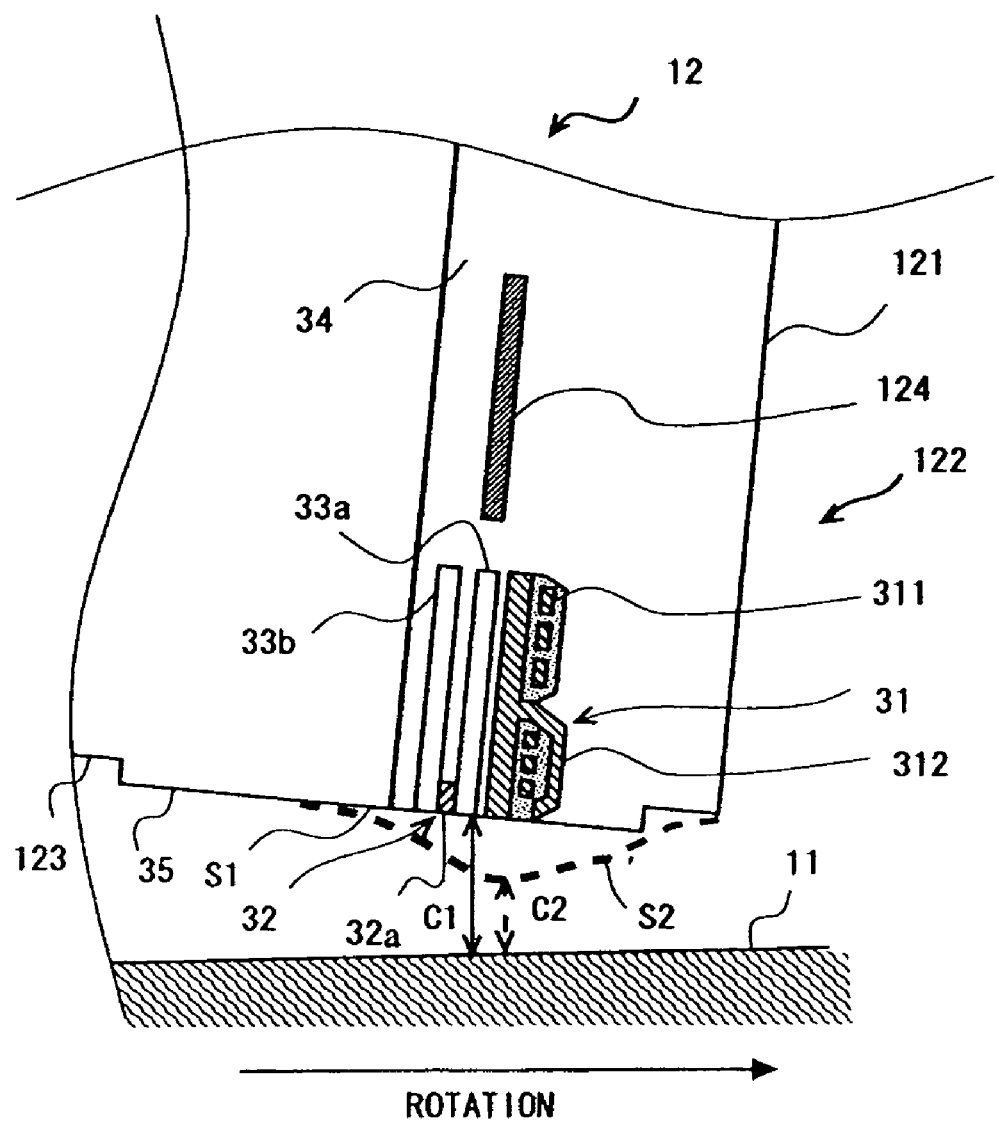
FIG. 3 is a cross-sectional view schematically showing the configuration of the head slider equipped with a heater for the thermal fly-height control (TFC) according to one embodiment.
Figure 4A:
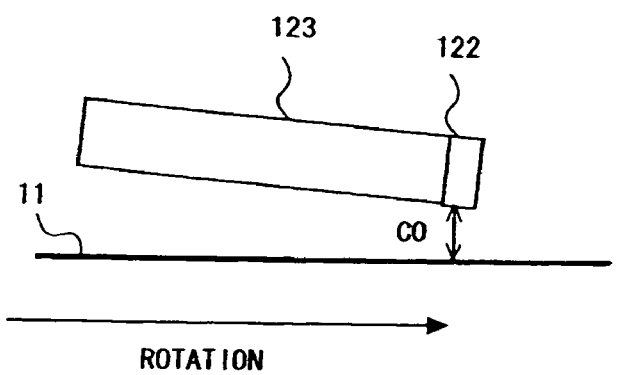
FIGS. 4(a)-4(d) schematically show each state of the head slider at the time of measurement in the method for determining contact with varying the heater power value in one embodiment.
Figure 4B:
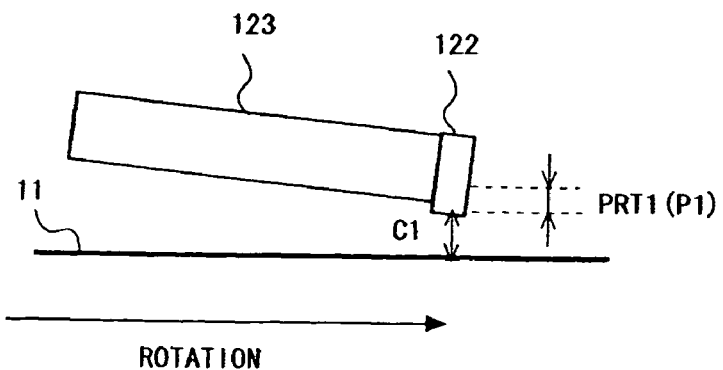
Figure 4C:
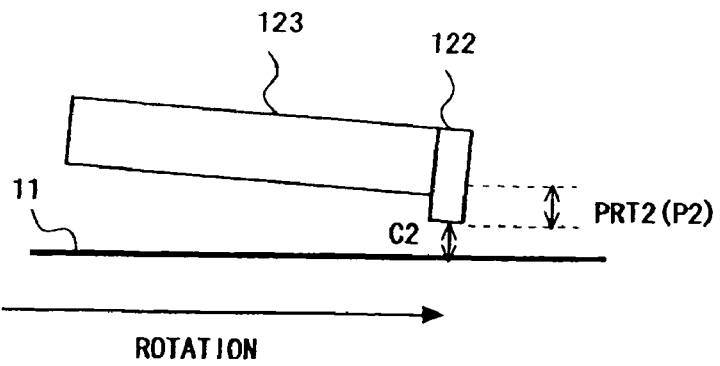
Figure 4D:
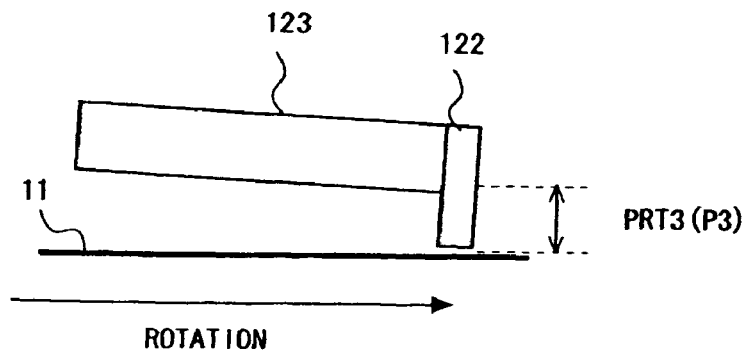

FIG. 3 is a cross-sectional view schematically showing a configuration in the vicinity of air flowing end surface (trailing side end surface) 121 of the head slider 12. A head element portion 122 held by a slider 123 has a read element 32, a write element 31, and a protective film thereof 34. The write element 31 generates magnetic fields between magnetic poles 312 by means of electric current flowing across a write coil 311 to record magnetic data onto the magnetic disk 11. The read element 32 has a magnetoresistive element 32a having magnetic anisotropy and retrieves magnetic data by means of resistance varying in accordance with magnetic fields from the magnetic disk 11. The magnetoresistive element 32a is sandwiched between magnetic shields 33a and 33b.

A heater 124 is formed in the vicinity of the write element 31 and the read element 32. The heater 124 may be formed of a thin film resistive element using permalloy, for example. When the AE 13 supplies the heater 124 with electric power, the vicinity of the head element portion 122 is deformed to protrude due to the heat of the heater 124. For example, in non-heating of the heater 124, the shape of the ABS of the head slider 12 is indicated by S1 and the clearance between the head element portion 122 and the magnetic disk is indicated by C1. The protruding shape S2 in heating the heater 124 is illustrated by a dashed line in FIG. 3. The head element portion 122 comes close to the magnetic disk 11 and the clearance C2 at this time is smaller than the clearance C1. FIG. 3 is a conceptual view and its dimensions are not rigidly defined. The protruding amount of the head element portion 122, or the clearance between the head element portion 122 and the magnetic disk 11, varies in accordance with the heater power supplied to the heater 124. The heater power value is a control value for controlling the clearance adjustment amount.

The clearance between the bead element portion 122 and the magnetic disk 11 varies with the environmental temperature (the temperature in the enclosure 10), the air pressure, the operating conditions in reading/writing, and the like. Specifically, the protruding amount of the head element portion 122 increases as the temperature rises so that the clearance between the magnetic disk 11 and the head element portion 112 decreases. The fly-height of the slider 123 decreases as the air pressure goes down so that the clearance decreases. Or, the head element portion 122 protrudes due to heat generation of the write coil 311 in a write operation so that the clearance gets smaller in data writing than in data retrieving. The clearance amount in an OFF state of the heater 124 and the relationship between the heater power and the clearance vary with every head slider 12. The heater power is thus controlled in accordance with the environmental and operating conditions and the heater power may be controlled for each head slider 12.

The HDC/MPU 23 according to the present embodiment calibrates a heater power value for each head slider 12 in accordance with the environmental and operating conditions. The HDC/MPU 23 determines the clearance between the head element portion 122 and the magnetic disk 11 at a specific heater power value including the heater OFF state under specific conditions. Further, it determines the clearance variation in accordance with variation in the heater power value, the clearance variation in accordance with change in environmental conditions such as temperature change, and the clearance variation in accordance with the write current amount. The HDC/MPU 23 specifies the optimum heater power value for each head slider 12 corresponding to the environmental and operating conditions from these relational expressions.

A feature of the present embodiment is a method for determining the relationship between the heater power value and the clearance in the above-described processes. The HDC/MPU 23 writes data at a selected radial position using a selected head slider 12. Then, the HDC/MPU 23 varies the clearance by means of the TFC and measures amplitudes of read signals at a plurality of points at each of a plurality of different heater power values. The HDC/MPU 23 determines the heater power value at which contact between the head slider 12 (the head element portion 122) and the magnetic disk 11 has occurred, using the measured amplitudes of read signals. The difference between a specific heater power value and the heater power value at which contact has been determined represents the clearance at the time of data writing at the specific heater power value. For example, if the above-described specific heater power value is zero, the heater power value where the contact has been determined represents the clearance in data writing in an OFF state.

A detailed example of a method for determining contact using amplitudes of read signals measured with varying heater power will be described. FIGS. 4(*a*)-4(*d*) schematically depict states of the head slider 12 in measuring the amplitudes of read signals according to this method. First, as shown in FIG. 4(*a*), the head slider 12 writes data in a state that the heater power is OFF and the clearance is C0. In addition, the HDC/MPU 23 measures the amplitudes of signals read with the head slider 12 at a plurality of points of written data.

If the contact between the head slider 12 and the magnetic disk 11 has not occurred, the HDC/MPU 23 makes the head element portion 122 protrude at the heater power value of P1 as shown in FIG. 4(*b*). The protruding amount and the clearance at this time are denoted by PRT1 and C1 respectively, where C1<C0. The HDC/MPU 23 measures the amplitudes of read signals at a plurality of points of data like the operation at the heater power OFF state and determines whether or not contact has occurred between the head slider 12 and the magnetic disk 11 from the measured amplitudes of read signals. Subsequently, as shown in FIGS. 4(*c*) and 4(*d*), the HDC/MPU 23 repeats measurement of the amplitudes of read signals gradually increasing the heater power. In the state of the heater power of P3 and the protruding amount of PRT3, the HDC/MPU 23 detects contact, where P1<P2<P3, and PRT1<PRT2<PRT3.

Figure 5A:
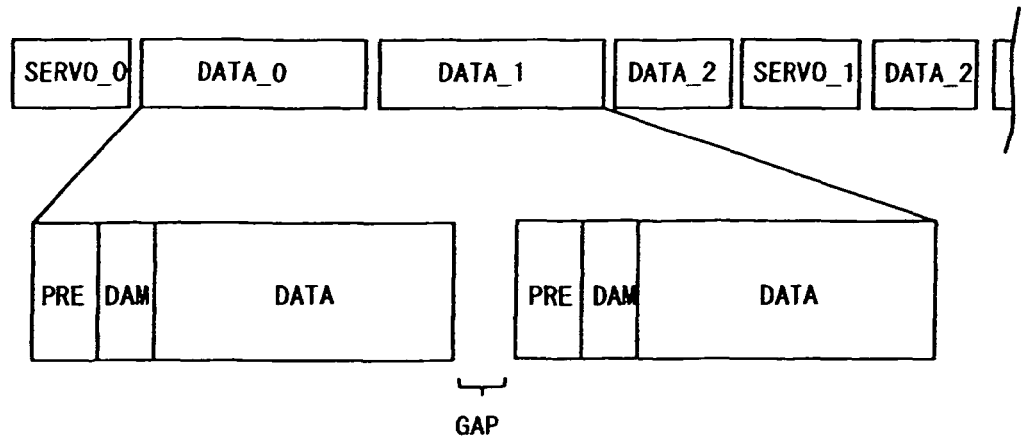
FIGS. 5(a) and 5(b) are views schematically showing formats of data sectors to be written for the contact determination according to one embodiment.
Figure 5B:
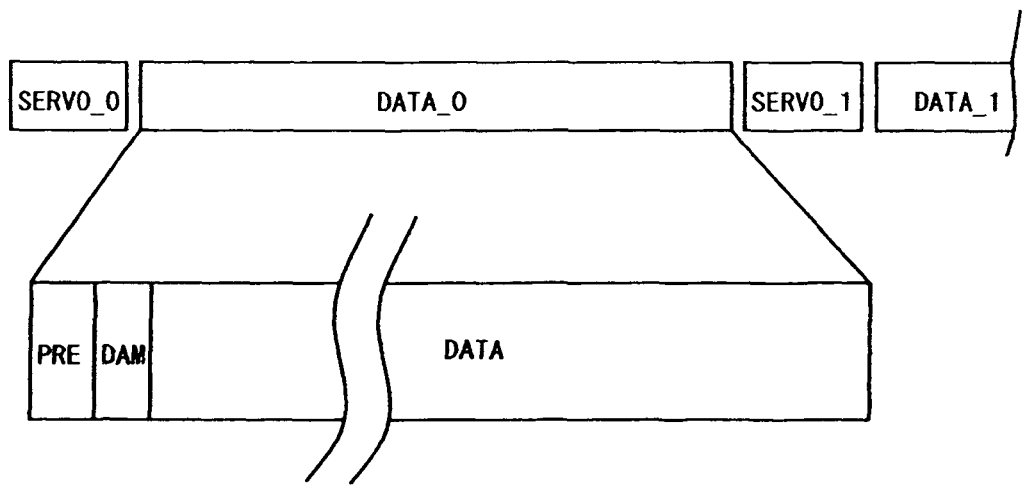

The HDC/MPU 23 according to the present embodiment writes only one data sector between servo data in a data write operation for measuring the amplitudes of read signals. FIG. 5(*a*) depicts user data written in the magnetic disk 11 in a normal operation. Data sectors DATA_0 to DATA_2 are recorded between servo data SERVO_0 and SERVO_1. The data sector DATA_2 is a split sector and only the anterior half thereof are written between the servo data SERVO_0 and SERVO_1.

A data sector contains a preamble field PRE, a data address mark field DAM, and a user data field DATA. The preamble field PRE and the data address mark field DAM are control data areas used by the RW channel to retrieve the user data field DATA accurately. The user data from the host 51 is written in the user data field DATA. A gap GAP is present between the data sectors and also present between the servo data and the data sector.

The HDC/MPU 23 measures the amplitudes of read signals in the user data field DATA for contact determination. There are gaps between respective data sectors in the recording format in a normal operation depicted in FIG. 5(*a*). Besides, each of the plurality of data sectors between servo data has a preamble field PRE and a data address mark field DAM. Therefore, the HDC/MPU 23 cannot freely select points for measuring the amplitudes of read signals in the area between servo data. Or, it is required that the HDC/MPU 23 measures the amplitudes of read signals at a plurality of arbitrary points and selects the measured values in the user data field DATA among all of the measured values.

The HDC/MPU 23 according to the present embodiment fills a gap between servo data with one data sector as shown in FIG. 5(*b*). The data sector for contact determination has the same format as a normal data sector and has a preamble field PRE, a data address mark field DAM, and a user data field DATA. The formats of the preamble field PRE and the data address mark field DAM are the same as the ones in a normal data sector.

Since there is only one data sector between servo sectors, there is no gap between data sectors, and further, a region occupied by the preamble field PRE and the data address mark field DATA can be reduced. Forming such a continuous data sectors between servo data enables the HDC/MPU 23 to measure the amplitudes of read signals at substantially any point. The HDC/MPU 23 writes only one data sector between respective servo data of all the servo data. Data sectors constituting a data track are one each between servo data. Therefore, the HDC/MPU 23 can measure the amplitudes of read signals at substantially any point on a data track to achieve more accurate detection of contact between the head slider 12 (head element portion 122) and the magnetic disk 11.

Next, a method for determining contact between the head slider 12 and the magnetic disk 11 will be described. In a preferred example, the HDC/MPU 23 calculates $\sigma$ of the amplitudes of read signals and determines that contact has occurred if the $\sigma$ exceeds a reference value. Specifically, the HDC/MPU 23 measures the amplitudes of read signals in each data sector. For more accurate determination, the HDC/MPU 23 preferably measures the amplitudes of read signals at a plurality of points of each data sector as shown in FIG. 6(*a*). The intervals between the measuring points in each data sector are preferably constant. Besides, the positions of the measuring points are preferably the same in each data sector. Namely, the HDC/MPU 23 conducts measurements preferably at the same timing in all of the data sectors.

The HDC/MPU 23 calculates the standard deviation $\sigma$ of the amplitudes of read signals in the data track on which the measurement is performed. Each measured value is denoted by $x\_i$, the average thereof at all of the measuring points is denoted by $\mu$, and the number of measuring points is denoted by N. Further, the square sum of deviations $\Sigma(x\_i-\mu)2$ is denoted by S. $\sigma$ is a square root of S/N. The HDC/MPU 23 performs measurement during one rotation of the subject data track or more rotations thereof, and compares the $\sigma$ of the measured values with the reference value. If the $\sigma$ exceeds the reference value, the HDC/MPU 23 determines that contact has occurred.

In another preferred example, the HDC/MPU 23 performs contact determination using $\sigma$ of the differences between the measured values in a heater OFF state and the measured values at the heater power value at the time of the determination. The measuring points may be the same as indicated in FIG. 6(*a*), namely, as the above-described example. The difference between the average $\mu\_0$ of the measured values in the heater OFF state and the average $\mu\_k$ of the measured values at the heater power at the time of the determination is denoted by $\mu$. Further, the difference between the measured value in the heater OFF state and the measured value at the heater power at the time of the determination in each measuring point i is denoted by $x\_i$. The HDC/MPU 23 calculates $\sigma$ of this $x\_i$ in the same manner as the above example and compares it with the reference value to perform contact determination.

Figure 6A:
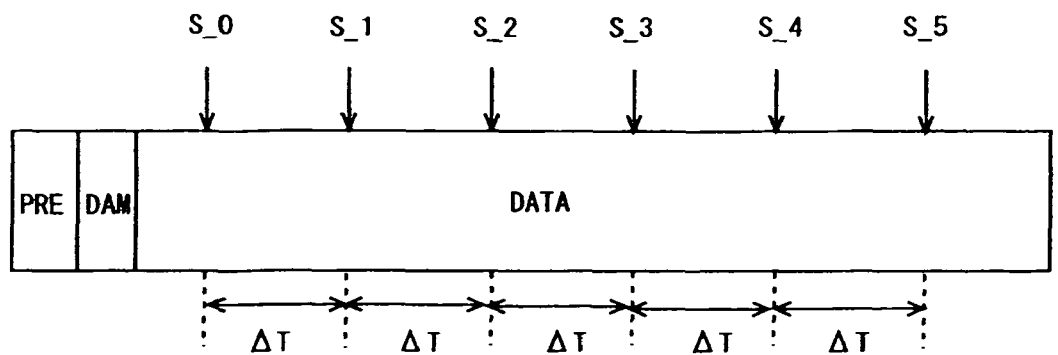
FIGS. 6(a) and 6(b) are views schematically illustrating examples of measuring points of read signals for contact determination according to one embodiment.
Figure 6B:
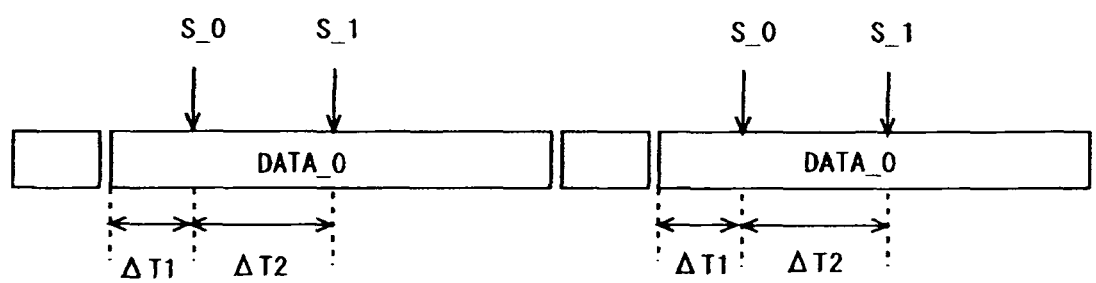

In yet another preferred example, the HDC/MPU 23 performs contact determination using $\sigma$ of the differences between the measured values in each data sector. As shown in FIG. 6(*b*), the HDC/MPU 23 obtains measured values S_0 and S_1 in one data sector and calculates the differences, which is $x\_i$. The HDC/MPU 23 calculates the average value μ of x_i. The HDC/MPU 23 calculates σ from x_i of each data sector and the average value μ. If exceeds a reference value, the HDC/MPU 23 determines that contact has occurred at the particular heater power value. In the example of FIG. 6(b), positions of the measuring points in all of the data sectors are preferably common, too. The HDC/MPU 23 may perform measurement at more than two points per data sector to calculate σ of the differences between the measured values. In this case, the intervals between the measuring points in each data sector are preferably constant as described referring to FIG. 6(a).

Hereinafter, a flow of calibration of the heater power value according to the present embodiment and measuring the clearance therein, and operations of components in the HDD 1 in measuring the clearance will be described. First, in fabricating the HDD, the calibration according to embodiments of the present invention is performed after assembling the HDD 1 shown in FIG. 1. In other words, in one embodiment, a circuit implemented in the HDD 1 carries out the calibration of heater power value.

Figure 7:
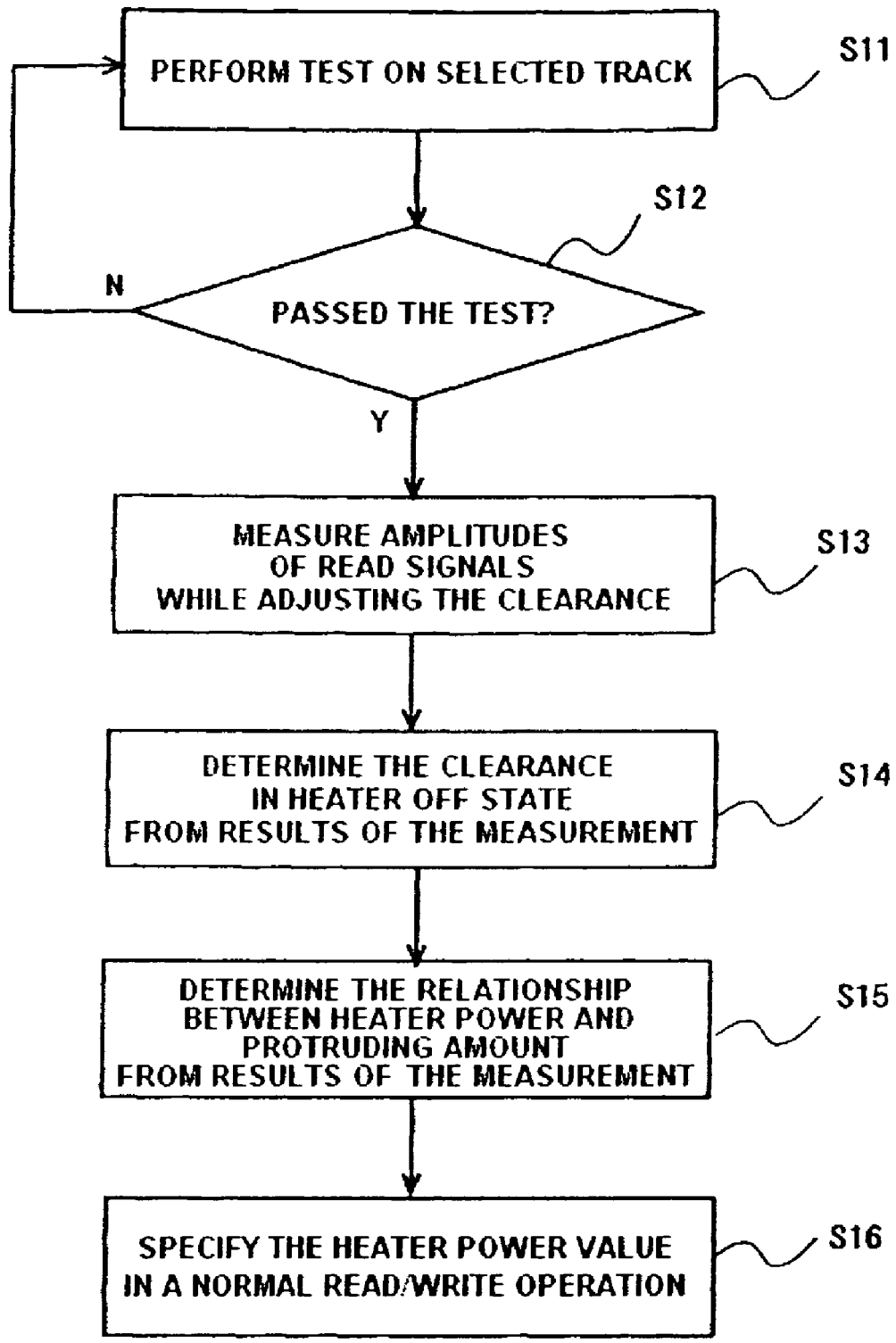
FIG. 7 is a flowchart illustrating an entire procedure of the calibration of heater power value according to one embodiment.

FIG. 7 is a flowchart illustrating the entire procedure of the calibration of heater power value according to the present embodiment. The HDC/MPU 23 first selects a track where the data are to be written for the clearance measurement and performs a predetermined characteristic test on the selected track (S11). If the selected track does not satisfy the predetermined criteria (N in S12), the HDC/MPU 23 selects a different track and performs the same test on the track (S11). For example, the test performs data write and retrieval with the head slider 12 and measures an error rate. The HDC/MPU 23 determines that the track has passed the test if each data sector can be accurately read and the error rate is the reference value or less.

If a specific data track passes the above test (Y in S12), the HDC/MPU 23 performs clearance measurement on the data track according to the above-described manner (S13). That is, the HDC/MPU 23 performs contact determination using the amplitudes of read signals while adjusting the clearance by means of the TFC. In addition, the HDC/MPU 23 determines the distance of the clearance in a data write in a heater OFF state using the heater power value determined in S13 (S14). The HDC/MPU 23 also determines the relationship between the heater power and the protruding amount using the heater power value determined in S13 (S15).

The HDC/MPU 23 specifies the heater power value in a normal read and/or write operation using the value and the relationship determined in S14 and S15 respectively (S16).

The HDC/MPU 23 determines the relationships between write current and the protruding amount (variation in clearance), between temperature and the protruding amount (variation in clearance), between air pressure and the protruding amount (variation in clearance), and the like by means of the calibration. An appropriate heater power value corresponding to the environmental and operation conditions of the subject head slider 12 can be specified from these relationships and the values and relationships obtained in steps S14 and S15.

For example, the protruding amount by temperature change with respect to a reference temperature is denoted by PRT_T, the protruding amount by heat generation of the heater 124 is denoted by PRT_H, and the protruding amount by write current is denoted by PRT_W. Each protruding amount is expressed by a distance in the unit of nm, for example. The entire protruding amount PRT_TTL[nm] is the sum of these, (PRT_T+PRT_H+PRT_W). With respect to each head slider 12 PRT_T and PRT_W are preliminarily determined by calibration. Methods for the calibration have been widely known and the explanation thereof will be omitted herein. Depending on designs, variations in protruding amounts other than these should be considered.

For more accurate control, it is preferable that the above PRT_T and PRT_W are calibrated in each head slider 12, but the same value (relationship) determined in design steps may be used for these PRT_T and PRT_W in the head sliders with the same design or on the same wafer. PRT_W may be determined by relating the write current to the heater power value of the heater 124. PRT_H and PRT_W may vary with temperature. The clearance between the head element portion 122 and the magnetic disk 11 may be determined according to the actual distance or the set value in the TFC (beater power value).

Figure 8:
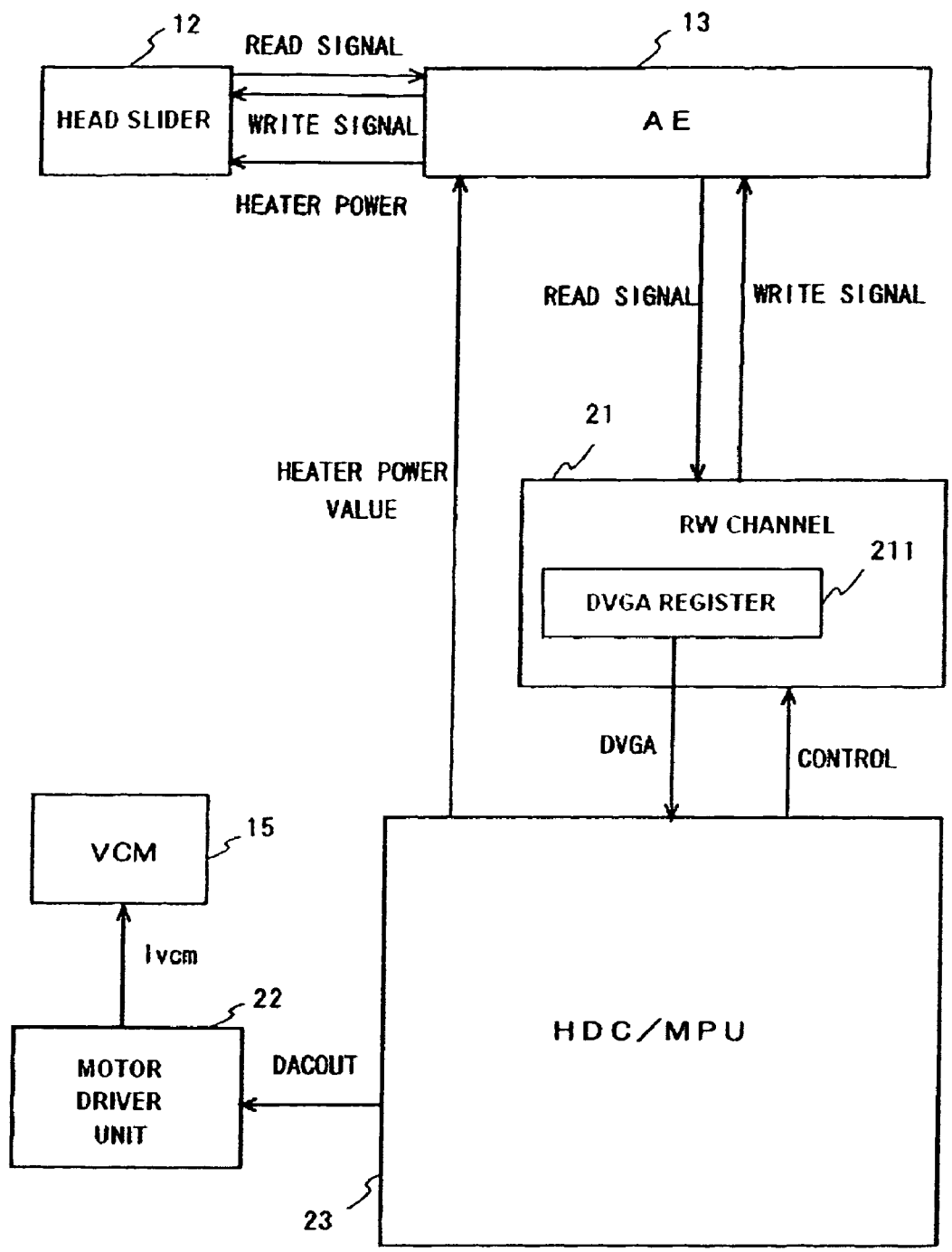
FIG. 8 is a block diagram schematically depicting components in the HDD 1 for measurement using the TFC according to one embodiment.

Hereinafter, details of the contact determination for clearance measurement using the TFC (S13) will be described referring to FIGS. 8 and 9. FIG. 8 is a block diagram schematically illustrating components in the HDD 1 to measure amplitudes of read signals and to determine contact. FIG. 9 is a flowchart illustrating the flow of these operations. The HDC/MPU 23 moves a head slider 12 for performing calibration to a data track which has passed the test (S131). Specifically the HDC/MPU 23 sends the motor driver unit 22 control data DACOUT so that the servo data retrieved by the head element portion 122 get close to a target value. The motor driver unit 22 supplies electric current lvcm to the VCM 15 in accordance with the control data DACOUT.

Subsequently, the HDC/MPU 23 sets the heater power of the heater 124 to an initial value (S132). For example, the initial value is zero. The HDC/MPU 23 varies the power value to be supplied to the heater 124 by controlling the AE 13. As shown in FIG. 6, the HDC/MPU 23 stores data indicating the heater power value (HEATER POWER VALUE) in a register of the AE 13. The AE 13 supplies the power indicated by the data stored in the register (HEATER POWER) to the heater 124 of the selected head slider 12.

The HDC/MPU 23 controls the AE 13 and the RW channel 21 to perform a data write operation with the selected head slider 12 (S133). As described referring to FIG. 5(b), the data sector to be written at this time is only one between servo data. The data to be written are the same in all of the sectors. The HDC/MPU 23 measures amplitudes of read signals in the written data (S134). The measurement of the amplitudes of read signals may employ a method described referring to FIGS. 6(a) and 6(b).

The HDC/MPU 23 obtains data VGA (DVGA) as data indicating the amplitudes of read signals from the RW channel 21. DVGA are values inverse proportional to the amplitudes of read signals. The RW channel 21 stores VGA values in AGC in a DVGA register 211 in retrieving user data. The HDC/MPU 23 can obtain the data VGA values at predetermined measuring points by referring to the DVGA register 211.

The HDC/MPU 23 determines whether or not contact between the head slider 12 and the magnetic disk 11 has occurred using the obtained DVGA values (S135). If it determines that the contact has not occurred (N in S135), the HDC/MPU 23 increases the heater power (S137) and repeats the above-described measurement of signal amplitudes (S134). If it determines that the contact has occurred (Y in S135), it stores and saves the data indicating the heater power at that time in the RAM 24 (S136). This is the end of the contact determination step (S13) for measuring the clearance.

The contact determination using the amplitudes of read signals (S13) is performed on one or more data tracks. The number of tracks and the radial position of the track to be used may be changed depending on the designs. For more accurate measurement, it is preferable that the test is carried out on a plurality of data tracks.

As set forth above, embodiments of the present invention are described by way of particular embodiments but are not limited to the above embodiments. A person skilled in the art can easily modify, add, and convert the each element in the above embodiments within the scope of the present invention. For example, the clearance measurement by means of the above-described read and write test may be applied to a disk drive device having a clearance adjustment mechanism for adjusting the clearance between the head slider and the magnetic disk other than the TFC, such as a piezo element.

The format of the data sectors for the measurement may be different from the one of a normal data sector. Data other than the VGA value may be used as data indicating the amplitudes of read signals. The circuit implementing the embodiments of present invention may be a test circuit used in fabricating steps instead of a circuit mounted in the HDD product. The measuring point of each data sector may be one. Embodiments of the present invention may preclude performing the measurement on a part of the data sectors.

What is claimed is:

1. A method for fabricating a disk drive device comprising:
assembling a disk drive device having a head and a disk and being capable of adjusting a clearance between the head and the disk;
writing a data track in which respective sections between a plurality of servo data formed discretely in a circumferential direction are one continuous sector;
measuring amplitudes of read signals at each of a plurality of points of the data track at each of a plurality of different clearance control values;
determining a clearance control value at which the head contacts the disk using a value indicating the measured amplitudes of read signals; and
specifying a clearance control value in a normal operation using the determined clearance control value.

2. The method for fabricating a disk drive device according to claim 1, wherein
the measuring measures amplitudes of read signals at a plurality of points in each of all the sectors.

3. The method for fabricating a disk drive device according to claim 2, wherein
the measuring is performed at more than two points in each of all the sectors; and
intervals between the measuring points are constant in each of all the sectors.

4. The method for fabricating a disk drive device according to claim 1, wherein
respective measuring point positions of the respective sectors are common in all the sectors.

5. A device for specifying a clearance control value in a disk drive device having a function for controlling a clearance between a head and a disk, comprising:
a disk having a plurality of servo data formed discretely in a circumferential direction;
a head flying above a rotating disk; and
a controller for controlling a clearance between the head and the disk; wherein
the head writes a data track in which respective sections between the plurality of servo data are consisted of one continuous sector;
the controller measures amplitudes of read signals at each of a plurality of points of the data track at each of a plurality of different clearance control values, determines a clearance control value at which the head contacts the disk using a value indicating the measured amplitudes of read signals, and specifies a clearance control value in a normal operation using the determined clearance control value.

6. The device according to claim 5, wherein
the controller measures amplitudes of read signals at a plurality of points in each of all the sectors.

7. The device according to claim 6, wherein
the controller performs measurement at more than two points in each of all the sectors; and
intervals between the measuring points are constant in each of all the sectors.

8. The device according to claim 5, wherein
respective measuring point positions of the respective sectors are common in all the sectors.

9. The device according to claim 5, wherein
the head comprises a slider flying above a rotating magnetic disk, a head element portion disposed on the slider, and a heater for making the head element portion protrude by thermal expansion to adjust a clearance between the head element portion and the disk; and
the clearance control value is a heater power value.

10. A method for specifying a clearance control value in a disk drive device having a function for controlling a clearance between a head and a disk, comprising:
writing a data track in which respective sections between a plurality of servo data formed discretely in a circumferential direction are one continuous sector;
measuring amplitudes of read signals at each of a plurality of points of the data track at each of a plurality of different clearance control values;
determining a clearance control value at which the head contacts the disk using a value indicating the measured amplitudes of read signals; and
specifying a clearance control value in a normal operation using the determined clearance control value.

11. The method of claim 10, wherein
the measuring measures amplitudes of read signals at a plurality of points in each of all the sectors.

12. The method of claim 11, wherein
the measuring is performed at more than two points in each of all the sectors; and
intervals between the measuring points are constant in each of all the sectors.

13. The method of claim 10, wherein
respective measuring point positions of the respective sectors are common in all the sectors.

* * * * *